(No Model.)

W. M. GARTSHORE.
CREAMER GAGE OR INDICATOR.

No. 554,259. Patented Feb. 11, 1896.

Witnesses
Jas. Edmunds
S. McBain

Inventor
William Moir Gartshore
By P. J. Edmunds
Attorney.

UNITED STATES PATENT OFFICE.

WILLIAM MOIR GARTSHORE, OF LONDON, CANADA.

CREAMER GAGE OR INDICATOR.

SPECIFICATION forming part of Letters Patent No. 554,259, dated February 11, 1896.

Application filed March 12, 1894. Serial No. 503,261. (No model.)

*To all whom it may concern:*

Be it known that I, WILLIAM MOIR GARTSHORE, a subject of the Queen of Great Britain, and a resident of the city of London, in the Province of Ontario, Canada, have invented a new and useful Creamer Gage or Indicator, of which the following specification, taken in connection with the accompanying drawings, forms a full, clear, and exact description.

Heretofore creamer-cans have been provided with a creamer gage or indicator formed of a brittle, artificial, transparent substance, such as glass, which is easily fractured and is very often broken when handled to such an extent as it is in connection with a creamer-can or when subjected to the action of heat. Any break or fracture of this gage-glass renders the creamer-can useless, all of which is avoided and completely prevented by using my invention.

My invention consists of a creamer gage or indicator formed of an elastic or flexible transparent natural mineral substance, and after experimenting I find that a thin plate or layer of mica is the best substance to answer these requirements. At the same time this substance is durable and is not injuriously affected nor its characteristics impaired by the action of heat; and it also consists of the improved construction and combination of parts whereby said creamer-gage is secured to said creamer-can, as will be hereinafter first fully set forth and described, and then pointed out in the claims, reference being had to the accompanying drawings, wherein—

Figure 1:
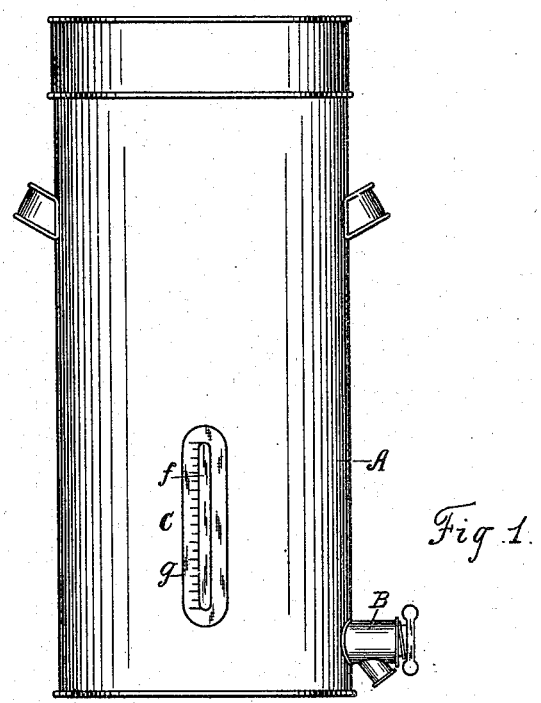
Figure 2:
Figure 3:
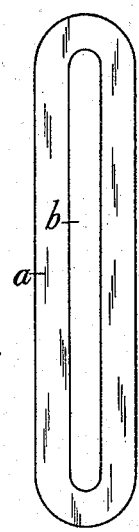
Figure 4:
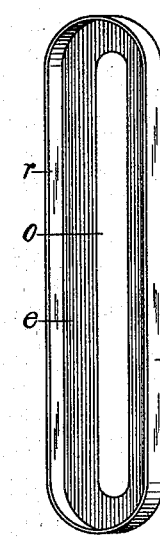
Figure 5:
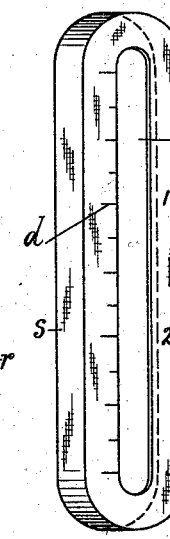
Figure 6:
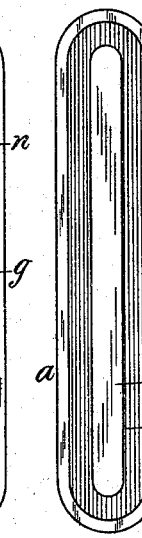
Figure 7:
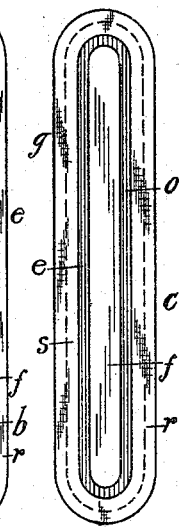

Figure 1 is a side elevation of a creamer-can, illustrating the application of my invention. Fig. 2 is an enlarged detail side view of a layer of the transparent substance of which my creamer gage or indicator is formed. Fig. 3 is an enlarged detail side view of a plate formed with an elongated opening. Figs. 4 and 5 are enlarged detail perspective views of wrappers, the bodies and flanges of which are seamless. Fig. 6 is a side view showing the first wrapper enveloping the plates shown in Figs. 2 and 3. Fig. 7 is a side view of the plates shown in Figs. 2 and 3 enveloped in both wrappers.

A designates the creamer-can, B the valve for drawing off the milk, and C the creamer gage or indicator. One of the purposes for which it is used is to indicate the depth of cream in said can A.

$d$ designates a measuring-register formed on the wrapper $g$.

$a$ designates a plate formed with an elongated opening $b$.

$e$ designates an interior or first wrapper formed with an elongated opening $o$ and with the seamless or other suitable flange $r$. The plate $a$ is first placed on or against the transparent plate $f$. These plates $a$ and $f$ are then placed in the wrapper $e$, so that the opening $b$ in the plate $a$ will come opposite the opening $o$ in the plate $e$. The flange $r$ is then folded, as shown in Fig. 6, and when folded is tightly compressed with or without a packing of rubber or other suitable material on the plates $f$ and $a$.

$g$ designates an additional wrapper formed with an elongated opening $n$ and with a seamless or other suitable flange $s$. This opening $n$ is adjusted opposite the opening $o$, and the flange $s$ of the wrapper $g$ is then folded, as shown in Fig. 7, and the folds are tightly compressed on the wrapper $e$ to form a liquid-tight joint between said wrappers $e$ $g$ and plates $f$ and $a$. These wrappers $e$ $g$ and plate $a$ may be formed of any suitable material, but preferably of metal. When formed of thin metallic plates they are soldered or otherwise secured over an opening formed in the body of the creamer-can A.

By forming a creamer gage or indicator of a transparent natural mineral substance, as the opposite of an artificial substance, the natural mineral substance is cheaper because it is used in its natural state, while the other substance referred to is artificial—that is, it is made by compounding other substances, thereby making it more expensive—and by forming a creamer gage or indicator of an elastic transparent natural mineral substance, as the opposite of a brittle or artificial substance, all breaking or fracturing of this elastic substance is avoided and completely prevented, whereas the other substance is brittle and very liable to be and is easily broken or fractured, which renders the creamer-can useless; and, again, by forming a creamer gage or indicator of an elastic transparent natural mineral substance, such as mica, its characteristics are not impaired by the action of any extreme of heat, whereas the action of heat where the creamer-gage is formed of glass would be very liable to fracture the latter. The substance which I prefer to use for this purpose is mica; but foliated talc, gypsum, or other similar elastic or flexible substance may be used, and while I prefer the construction shown for securing the gage to the can I do not limit myself to the details thereof, as they may be modified in various ways without departing from the spirit of my invention.

Having thus described my invention, I claim—

1. A plate of mica, in combination with the plate $a$ and wrappers $e$ and $g$ formed with the openings, $b$ $o$ and $n$ respectively, substantially as and for the purpose set forth.

2. A creamer gage or indicator, formed of an elastic or flexible transparent natural mineral substance, in combination with the plate $a$ and wrapper $e$ formed with the openings $b$ and $o$ respectively, and the wrapper $e$ formed with a seamless flange $r$ substantially as and for the purpose set forth.

3. A creamer gage or indicator formed of an elastic or flexible transparent natural mineral substance, and a plate, $a$, formed with an opening, $b$, in combination with the wrappers, $e$, $g$, formed with the openings, $o$, and $n$, and seamless flanges, $r$, $s$, respectively, substantially as and for the purpose set forth.

In testimony whereof I have signed in the presence of the two undersigned witnesses.

WILLIAM MOIR GARTSHORE.

Witnesses:
P. J. EDMUNDS,
S. McBAIN.